US009632876B1

United States Patent
Sharma

(10) Patent No.: US 9,632,876 B1
(45) Date of Patent: Apr. 25, 2017

(54) BACKUP APPLIANCE REPLICATION TO PROVIDE VIRTUAL MACHINE RECOVERY AT A REMOTE SITE

(71) Applicant: EMC IP Holding Company LLC, Hopkinton, MA (US)

(72) Inventor: Anupam Sharma, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 145 days.

(21) Appl. No.: 14/576,887

(22) Filed: Dec. 19, 2014

(51) Int. Cl.
*G06F 11/00* (2006.01)
*G06F 11/14* (2006.01)

(52) U.S. Cl.
CPC ...... *G06F 11/1464* (2013.01); *G06F 11/1458* (2013.01); *G06F 11/1469* (2013.01); *G06F 2201/815* (2013.01); *G06F 2201/84* (2013.01)

(58) Field of Classification Search
CPC ............ G06F 11/1464; G06F 11/1446; G06F 11/1448; G06F 11/1458; G06F 11/1466; G06F 11/1469; G06F 2201/815; G06F 2201/84
See application file for complete search history.

(56) References Cited

U.S. PATENT DOCUMENTS

2013/0326260 A1* 12/2013 Wei .................. G06F 11/20
714/3

\* cited by examiner

*Primary Examiner* — Michael Maskulinski
*Assistant Examiner* — Anthony J Amoroso
(74) *Attorney, Agent, or Firm* — Van Pelt, Yi & James LLP

(57) ABSTRACT

Techniques to protect data are disclosed. A backup appliance configuration data associated with a first backup appliance associated with a first virtual machine environment is received at a host site. The backup appliance configuration data is replicated to a remote replication site. The backup appliance configuration data includes data usable at the remote replication site to provide at the remote replication site a replicated backup appliance that is associated with a second virtual machine environment at the remote replication site and is configured to access backup data stored by the first backup appliance and to use said backup data stored by the first backup appliance to recover to hosts at the replication site one or more virtual machines associated with the first virtual machine environment.

20 Claims, 5 Drawing Sheets

BACKUP APPLIANCE REPLICATION TO PROVIDE VIRTUAL MACHINE RECOVERY AT A REMOTE SITE

BACKGROUND OF THE INVENTION

In the typical current backup environment, backup applications using virtual machine vendor technology, e.g., VMware® technology, are currently able to use backup data to recover from catastrophic event (e.g., "disaster recover" or "DR") only in the local environment. Typically, in such environments the backup appliance used to perform backups is associated to a particular vCenter™ or other hypervisor manager/server, and the backup data can be include data associated with that particular vCenter™'s local management hosts. This may create one or more critical issues. For example, if the local backup appliance is destroyed and cannot be recovered on the source site, recovery may not be possible using current techniques, since if the backup appliance were recovered at a remote site it would not be able to cooperate with the vCenter™ at the remote site to recover associated virtual machines. In the worst case scenario, the entire source site may be destroyed, e.g., by fire or natural disaster, requiring that the entire environment be recovered at a remote location. However, using current techniques backup data store by the backup appliance at the source site could not be recovered using the same backup appliance recovered at a remote site. Even if techniques other than recovering the backup appliance at the remote site could be used to recover the virtual machines, certain virtual machines may be so critical that they need to be recovered immediately at the remote site, which may not be possible using such other techniques.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Backup appliance replication to a remote site is disclosed. In various embodiments, configuration and/or operational (e.g., checkpoint) data may be replicated from a local (source) site to a remote (replication and/or recovery) site. The replicated data may be used to configure a replica backup appliance at the remote site. In various embodiments, the replica may be used in the event of a catastrophic loss of the backup appliance and/or associated virtual machine hosts at the source site to recover the backup appliance, the virtual machines associated with the backup appliance, and/or other elements of the source site environment to recover such elements at the replication site.

Figure 1:
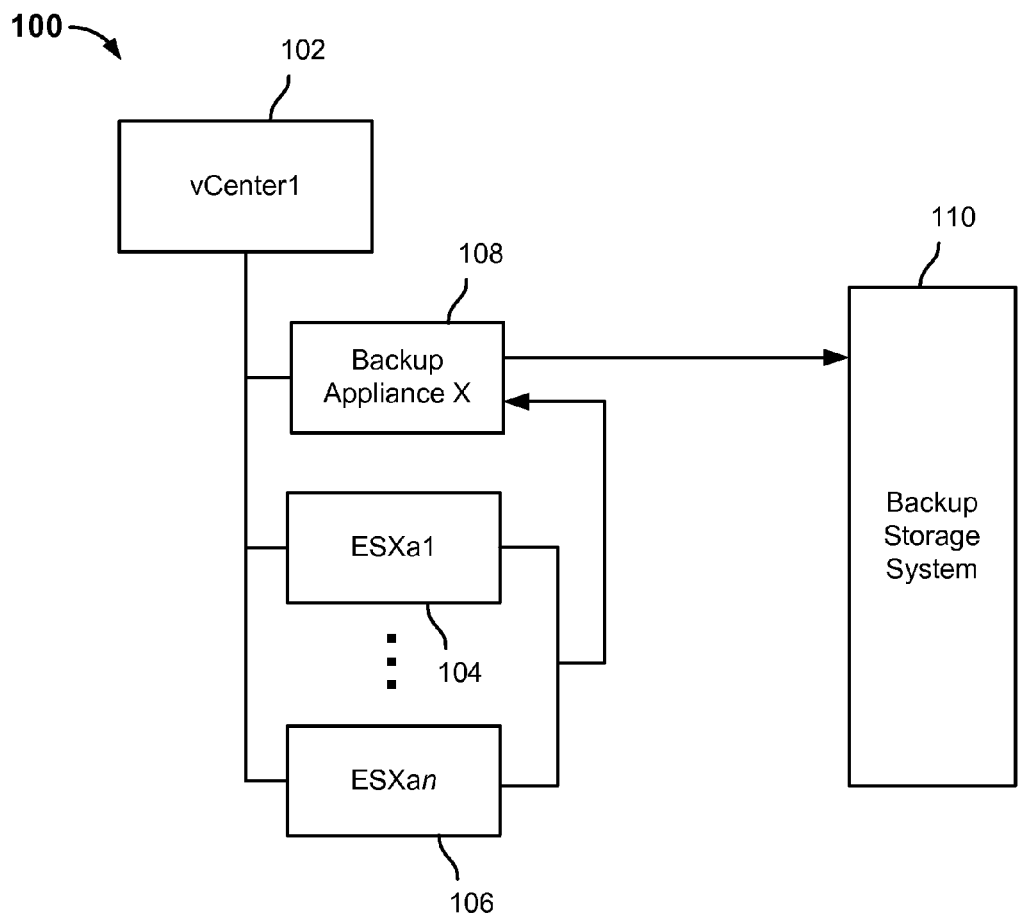
FIG. 1 is a block diagram illustrating a prior art system to back up virtual machine data.

FIG. 1 is a block diagram illustrating a prior art system to back up virtual machine data. In the example shown, a virtual machine and associated backup environment 100 includes a vCenter™ 102 configured to manage a set of virtual machine hosts ESXa1 through ESXan, represented in FIG. 1 by hosts 104 and 106. Virtual machines running on hosts managed by vCenter™ 102, e.g., host 104 and 106, are backed up by a backup appliance 108. Associated backup metadata (e.g., "checkpoint" and/or "snapshot" metadata) and underlying backup data (e.g., virtual machine disk and/or file data and metadata) are stored in a remote backup storage system 110, e.g., a Data Domain® de-duplicating storage system. In a typical environment, such as environment 100, and in particular in an environment in which VMware® virtualization technology is used to back up virtual machines, a backup appliance such as backup appliance 108, which may itself comprises and/or be running in a virtual machine, is registered with the local vCenter™, in this example vCenter™ 102, and cannot provide backup or recovery services with respect to hosts not associated with the same vCenter™/site. As a result, as mentioned above, in the prior art approach, in the event the backup appliance 108 is lost and cannot be restored at the local site, the backup appliance 108 cannot be recovered at a remote site, even if a backup of backup appliance 108 has been stored in the backup storage system 110 and the backup storage system 110 (or data replicated therefrom) remains available to the remote site, since the recovered backup appliance would not be registered to and due to its configuration could not become registered to the vCenter™ at the remote site, with the result that the recovered backup appliance could not recover to hosts at the remote site.

Figure 2:
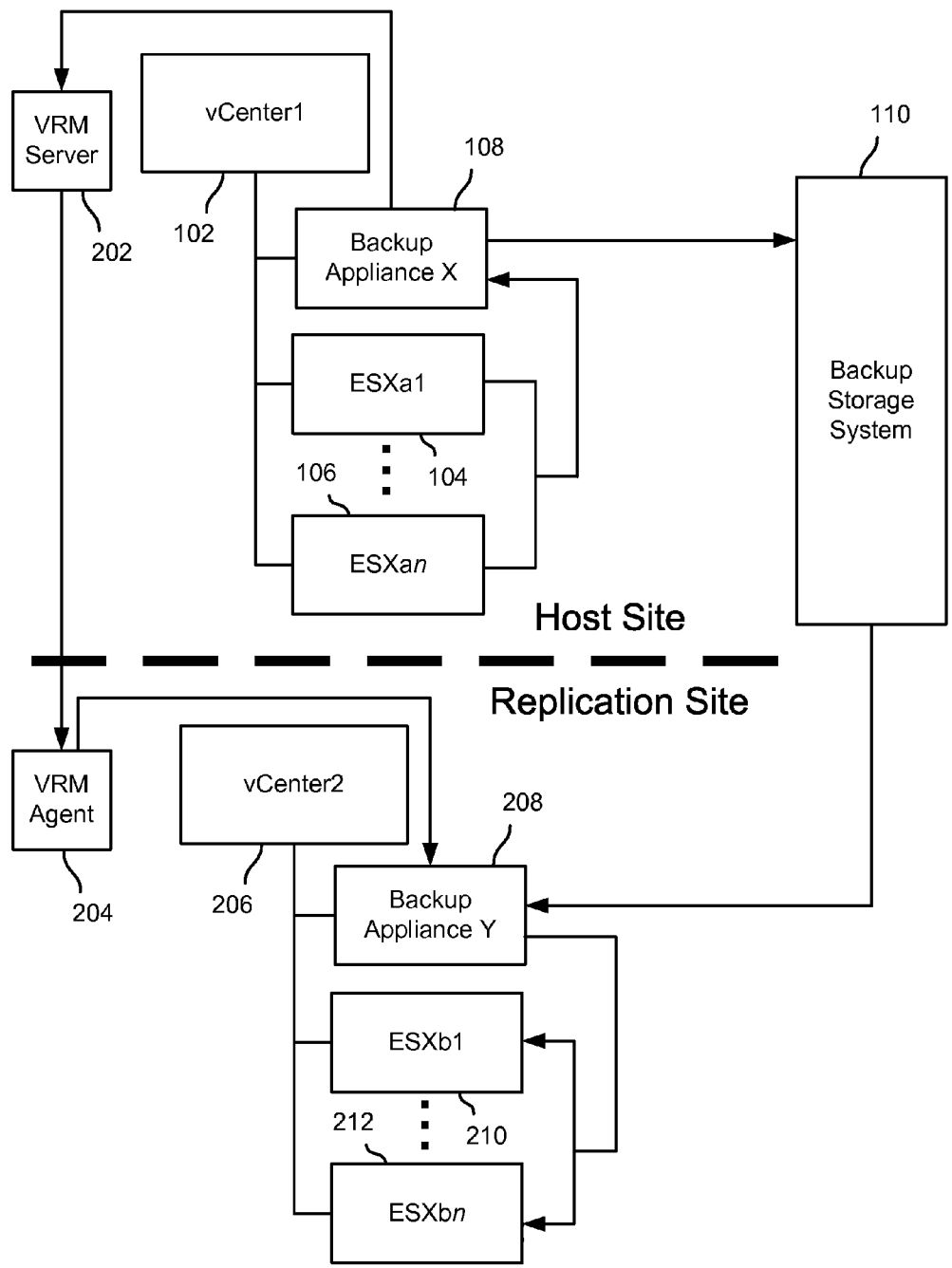
FIG. 2 is a block diagram illustrating an embodiment of a system to provide remote recovery of a virtual machine environment.

FIG. 2 is a block diagram illustrating an embodiment of a system to provide remote recovery of a virtual machine environment. In the example shown, a host site environment comprising vCenter™ 102; virtual machine hosts ESXa1 through ESXan, represented by hosts 104 and 106; and backup appliance X 108 is backed up to backup storage system 110, e.g., a Data Domain® or other storage system. In various embodiments, backup storage system 110 may be located physically at a location remote from the host site. A virtual replication management (VRM) server 202 replicates to a remote replication site, via a virtual replication management (VRM) agent 204 at or otherwise associated with the remote replication site, backup appliance configuration and/or other data associated with backup appliance X 108 at the host site. In various embodiments, a proprietary protocol and/or replication data format may be used to communication replication data from VRM server 202 to VRM agent client 204. In the example shown, a vCenter™ 206 at the remote replication site has a backup appliance Y 208 that is registered and/or otherwise associated with the vCenter™ 206. As a result, the backup appliance Y 208 has access to virtual machine hosts associated with vCenter™ 206 at the remote replication site, in this example including virtual machine hosts ESXb1 through ESXbn, represented in FIG. 2 by hosts 210 and 212.

In various embodiments, VRM server 202 is configured to replicate to VRM agent client 204 backup appliance configuration data, e.g., backup appliance IP address data and/or vCenter™ IP address data to be used to register the backup appliance. In some embodiments, the backup appliance X 108 at the host site is configured with IP addresses for both the host site and the remote replication site. For example, a first set of IP addresses may include host site IP addresses for vCenter™ 102 and backup appliance X 108, respectively, and a second set of IP addresses may include replication site IP addresses, e.g., for vCenter™ 206 and backup appliance Y 208.

In various embodiments, backup appliance configuration data replicated by VRM server 202 to VRM agent 204 may be used at the replication site to instantiate and configure backup appliance Y 208. For example, the replication site IP addresses provisioned to the backup appliance X 108 at the host site, and subsequently replicated to the replication site by VRM server 202 to VRM agent 204 may be used at the replication site to instantiate backup appliance Y 208 (e.g., by associating with backup appliance Y 208 the replication site backup appliance IP address that was included in the configuration data of backup appliance X 108) and to configure backup appliance Y 208 (e.g., by registering backup appliance Y 208 with vCenter™ 206, using the replication site vCenter™ IP address that was included in the configuration data of backup appliance X 108).

In various embodiments, data replicated to the remote replication site via VRM server 202 and VRM agent 204 may be used at the remote replication site to recover to hosts at the remote replication site virtual machines backed up at the host site by backup appliance X 108. In various embodiments, replicated data is used by backup appliance Y 208 at the replication site to read directly from backup storage system 110 backup metadata (e.g., checkpoint and/or snapshot metadata) and/or backup data (e.g., virtual machine file data) stored on storage system 110 by backup appliance X 108 in connection with backing up virtual machines running on hosts at the host site, such as hosts 104 and 106. For example In some embodiments, data other than backup appliance configuration data may be replicated by VRM server 202 to VRM agent 204. For example, in some embodiments, metadata associated with backups performed by backup appliance X 108 may be replicated from VRM server 202 to VRM agent 204 and used at the replication site by backup appliance Y 208 to recover to hosts at the replication site one or more virtual machines backed up previously by backup appliance X 108 at the host site. In some embodiments, the backup metadata (e.g., checkpoint and/or snapshot metadata) may be read by backup appliance Y 208 from backup storage system 110, e.g., using backup appliance configuration data replicated from VRM server 202 to VRM agent 204.

In some embodiments, recovery at the remote replication site may be triggered automatically. For example, in some embodiments, VRM server 202 sends periodically a "heartbeat" signal to VRM agent 204. If a prescribed amount of time passes without a next heartbeat signal being received by VRM agent 204, in some embodiments VRM agent 204 will trigger automatically in response a recovery operation at the replication site, using backup appliance Y 208, of virtual machines associated with the host site.

Figure 3:
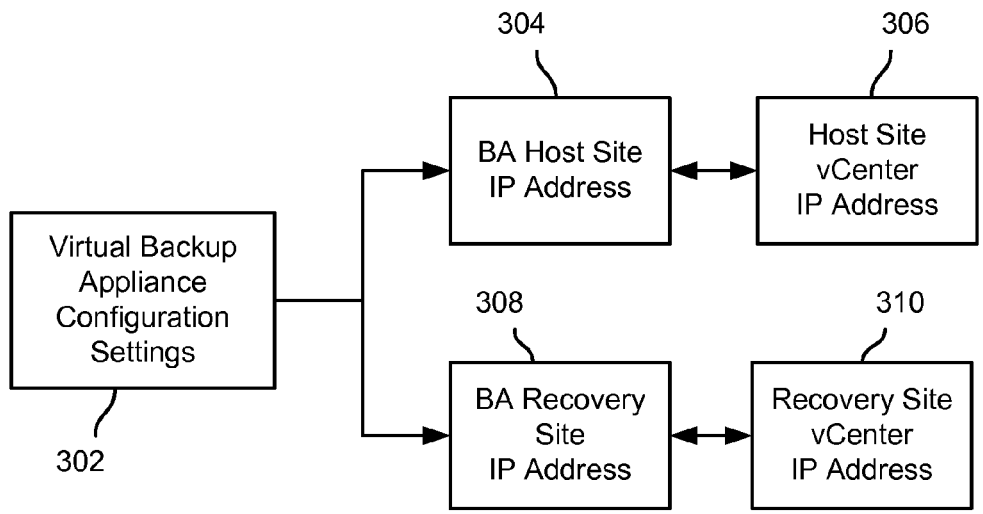
FIG. 3 is a block diagram illustrating an embodiment of a system to replicate a backup appliance associated with a virtual machine environment.

FIG. 3 is a block diagram illustrating an embodiment of a system to replicate a backup appliance associated with a virtual machine environment. In various embodiments, configuration data as shown in FIG. 3 may be provided to a backup appliance at a host site, such as backup appliance X 108 of FIG. 1. In the example shown, the virtual backup appliance configuration settings 302 include two sets of IP addresses, as described above. The first set includes a backup appliance host site IP address 304 and a host site vCenter™ IP address 306, both associated with the host (local) site, and the second set includes a backup appliance recovery (replication) site IP address 308 and a recover site vCenter™ IP address 310, both associated with the remote replication site. In various embodiments, the backup appliance at the local host site, e.g., backup appliance X 108 in the example shown in FIG. 2, uses the local host site IP addresses (e.g., addresses 304 and 306) to register itself with the local host site vCenter™, and after the same configuration settings are replicated to the replication site, the corresponding backup appliance instance at the replication site, e.g., backup appliance Y 208 in the example shown in FIG. 2, uses the second set of IP addresses (e.g., addresses 308 and 310) to register itself with the vCenter at the replication site, enabling the backup appliance at the replication site to have access to hosts at the replication site.

Figure 4:
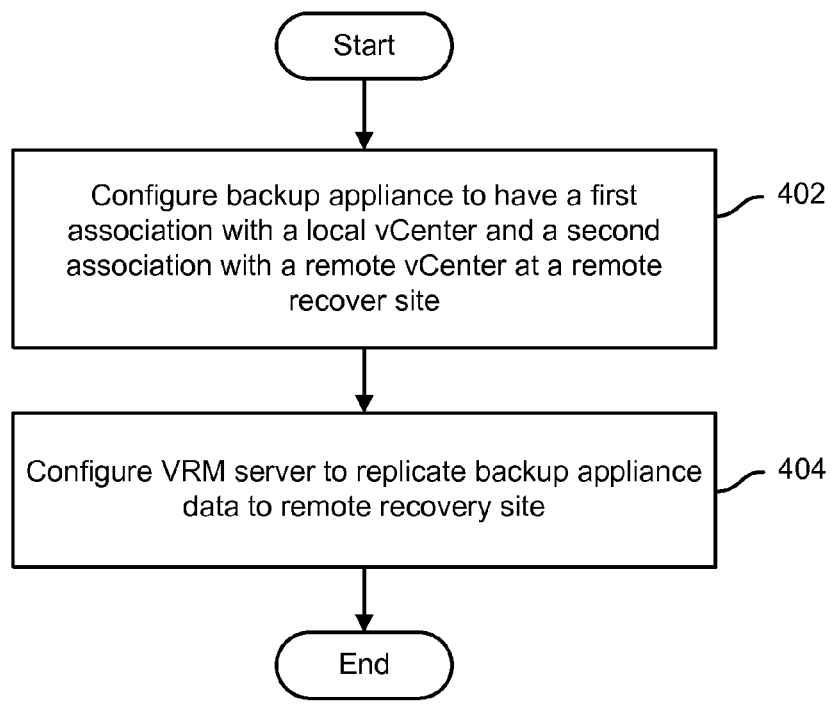
FIG. 4 is a flow chart illustrating an embodiment of a process to replicate backup appliance data to a remote site.

FIG. 4 is a flow chart illustrating an embodiment of a process to replicate backup appliance data to a remote site. In the example shown, a backup appliance at a host site, e.g., backup appliance X 108 in FIG. 2, is configured to have a first association with a local vCenter™ at the host site and a second association with a remote vCenter™ at a remote recovery site (402). For example, the backup appliance at the host site may be configured with IP addresses at both the host site and the remote site, as in the example shown in FIG. 3. A VRM server, such as VRM server 202 of FIG. 2, is configured to replication backup appliance configuration (and/or other) data from the host site to the remote site (404).

Figure 5:
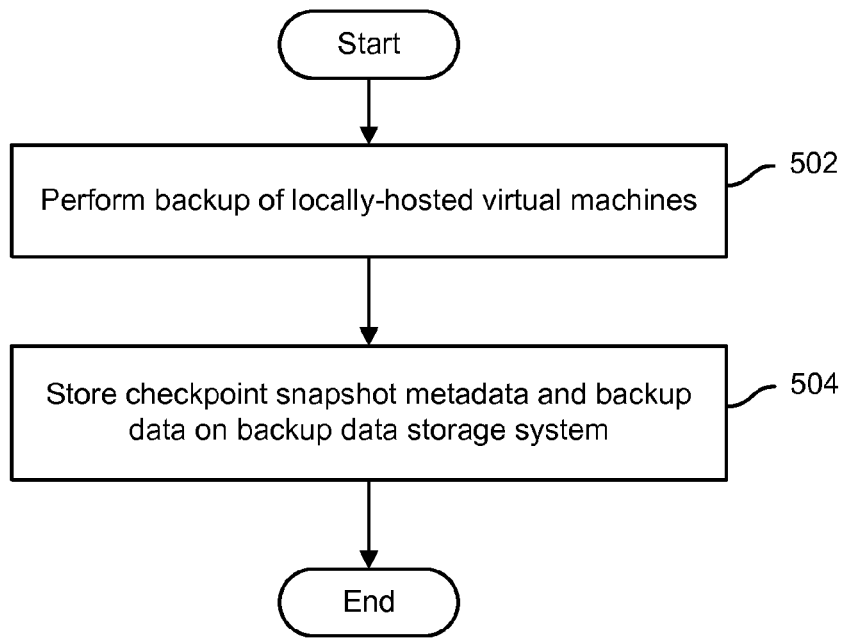
FIG. 5 is a flow chart illustrating an embodiment of a process to back up virtual machine data.

FIG. 5 is a flow chart illustrating an embodiment of a process to back up virtual machine data. In various embodiments, the process of FIG. 5 may be performed by a backup appliance at a host site, such as backup appliance X 108 in the example shown in FIG. 2. In the example shown, a backup of locally-hosted virtual machines is performed (502). For example, in the example shown in FIG. 2, backup appliance X 108 may perform backups of virtual machines running on hosts such as hosts 104 and 106. Checkpoint and/or snapshot metadata associated with the backup(s) and underlying backup data are stored on a backup data storage system, e.g., backup storage system 110 of FIG. 2 (504).

Figure 6:
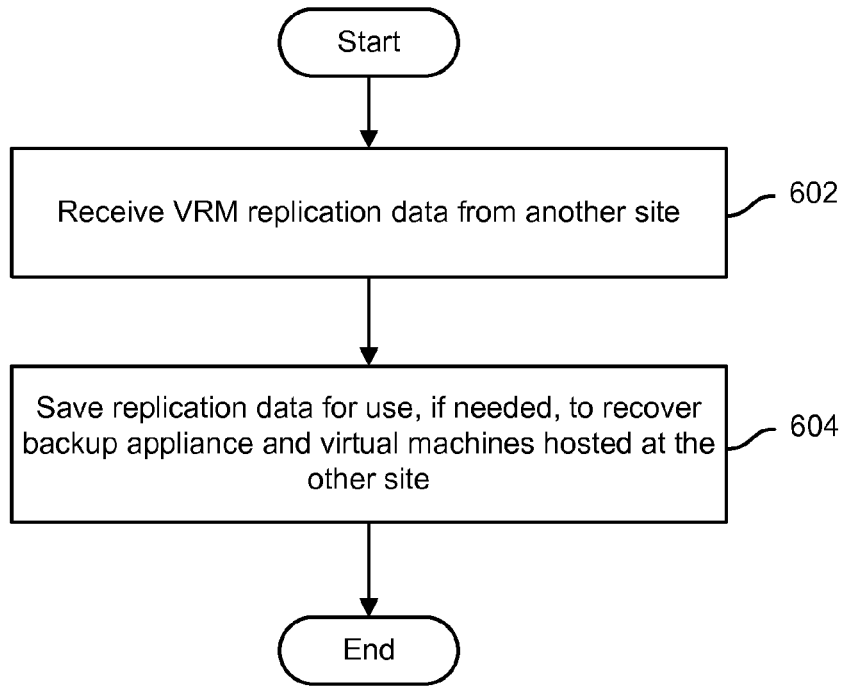
FIG. 6 is a flow chart illustrating an embodiment of a process to receive and store backup appliance replication data.

FIG. 6 is a flow chart illustrating an embodiment of a process to receive and store backup appliance replication data. In various embodiments, the process of FIG. 6 may be performed by a replication agent at a replication site, such as VRM agent 204 of FIG. 2. In the example shown, VRM replication data is received from another site, e.g., the host site in the example shown in FIG. 2 (602). The replication data is saved for use, if/as needed, to recover a backup appliance associated with the host site and/or virtual machines backed up at the host site by the backup appliance (604). In some embodiments, all or part of the replicated data may be used to instantiate and configure a replicated backup appliance, e.g., backup appliance Y 208 in the example shown in FIG. 2, at the replication site at a time prior to an indication being received to perform a recovery operation at the replication site. For example, the backup appliance at the replication site may be instantiated and configured, but may remain in a standby state unless/until a recovery of virtual machines backed up at the host site is required to be performed at the replication site.

Figure 7:
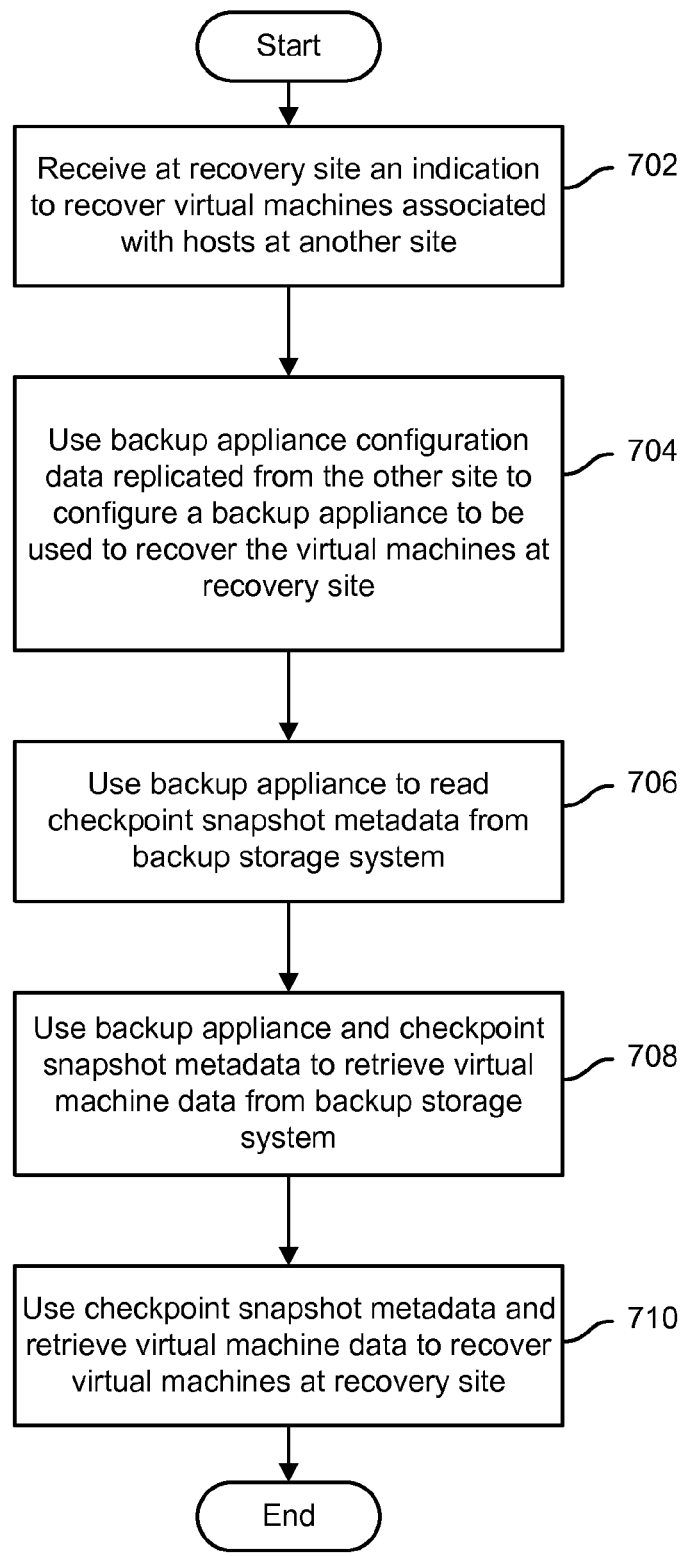
FIG. 7 is a flow chart illustrating an embodiment of a process to use backup appliance replication data to recover a virtual machine environment at a remote site.

FIG. 7 is a flow chart illustrating an embodiment of a process to use backup appliance replication data to recover a virtual machine environment at a remote site. In various embodiments, a backup appliance configured at a replication site based at least in part on backup appliance data replicated from a remote host site may perform all or part of the process of FIG. 7. In the example shown, an indication is received at a recovery (e.g., remote replication) site to recover virtual machines associated with hosts at another site, e.g., the "host site" in the example shown in FIG. 2 (702). Backup appliance configuration data replicated previously from the other site is used to configure a backup appliance at the recovery site to be used to recover to hosts at the recovery site virtual machines backed up at the other site by a corresponding backup appliance at that site, e.g., backup appliance X 108 in the example shown in FIG. 2 (704). The backup appliance at the recovery site is used to read from a backup storage system checkpoint/snapshot metadata stored in the backup storage system by the backup appliance at the other site in connection with a prior backup at the other site of the virtual machines while running on hosts at the other site (706). The backup appliance at the recovery site uses the checkpoint/snapshot metadata to retrieve the virtual machine backup data from the backup storage system (708). The retrieved checkpoint/snapshot metadata and virtual machine backup data are used at the recovery site, by the replicated backup appliance at the recovery site, to recover at the recover sites the virtual machines that had been running previously at the remote site (710).

In various embodiments, once a recovery operation has been completed at the replication site, as in the process of FIG. 7, the previously-replicated backup appliance may continue to back up the recovered virtual machines at the recovery site, e.g., on the same schedule as the backup appliance at the original host site had been configured to perform backups.

Using techniques disclosed herein, replicated backup appliance data may be used to perform disaster recovery of a virtual machine environment at a remote recovery site, enabling the environment to be recovered quickly at the remote site with minimal or no recovery time human intervention.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of protecting data, comprising:
   receiving a backup appliance configuration data associated with a first backup appliance associated with a first virtual machine environment at a host site, wherein the backup appliance configuration data at least indicates that the first backup appliance is configured with an IP address associated with the host site and an IP address associated with a remote replication site; and
   replicating the backup appliance configuration data to the remote replication site,
   wherein the backup appliance configuration data includes data usable at the remote replication site to provide at the remote replication site a replicated backup appliance that is associated with a second virtual machine environment at the remote replication site, wherein the IP address associated with the remote replication site is used to register the replicated backup appliance and enables the replicated backup appliance to access backup data stored by the first backup appliance and to use said backup data stored by the first backup appliance to recover to hosts at the remote replication site one or more virtual machines associated with the first virtual machine environment.

2. The method of claim 1, wherein the backup appliance configuration data is received and replicated to the remote replication site by a virtual replication management server at the host site.

3. The method of claim 1, wherein the backup appliance configuration data includes an IP address of a hypervisor manager at the host site.

4. The method of claim 1, wherein the backup appliance configuration data includes an IP address of a hypervisor manager at the remote replication site.

5. The method of claim 4, wherein the backup appliance configuration data is used at the replication site to instantiate the replicated backup appliance at the remote replication site and to register the replicated backup appliance to the hypervisor manager at the remote replication site.

6. The method of claim 5, wherein registering the replicated backup appliance to the hypervisor manager at the remote replication site enables the replicated backup appliance to access hosts at the remote replication site.

7. The method of claim 1, wherein the replicated backup appliance is configured to recover said one or more virtual machines to said hosts at the remote replication site.

8. The method of claim 1, further comprising receiving at the remote replication site an indication to recover said one or more virtual machines at the remote replication site.

9. The method of claim 8, wherein the indication comprises an absence of a signal from the host site.

10. The method of claim 1, wherein the backup data is stored by the first backup appliance in a backup storage system that is accessible to both the first backup appliance and the replicated backup appliance.

11. The method of claim 1, wherein the backup data is stored by the first backup appliance in a backup storage system includes one or more of checkpoint, snapshot, and other metadata about the backup.

12. The method of claim 11, wherein the replicated backup appliance is configured to use the metadata to recover the one or more virtual machines to hosts at the remote replication site.

13. A system to protect data, comprising:
a communication interface; and
a processor coupled to the communication interface and configured to:
receive a backup appliance configuration data associated with a first backup appliance associated with a first virtual machine environment at a host site, wherein the backup appliance configuration data at least indicates that the first backup appliance is configured with an IP address associated with the host site and an IP address associated with a remote replication site; and
replicate the backup appliance configuration data to the remote replication site via the communication interface,
wherein the backup appliance configuration data includes data usable at the remote replication site to provide at the remote replication site a replicated backup appliance that is associated with a second virtual machine environment at the remote replication site, wherein the IP address associated with the remote replication site is used to register the replicated backup appliance and enables the replicated backup appliance to access backup data stored by the first backup appliance and to use said backup data stored by the first backup appliance to recover to hosts at the remote replication site one or more virtual machines associated with the first virtual machine environment.

14. The system of claim 13, wherein the backup appliance configuration data includes an IP address of a hypervisor manager at the remote replication site.

15. The system of claim 14, wherein the backup appliance configuration data is used at the remote replication site to instantiate the replicated backup appliance at the remote replication site and to register the replicated backup appliance to the hypervisor manager at the remote replication site.

16. The system of claim 15, wherein registering the replicated backup appliance to the hypervisor manager at the replication site enables the replicated backup appliance to access hosts at the remote replication site.

17. The system of claim 16, wherein the replicated backup appliance is configured to recover said one or more virtual machines to said hosts at the remote replication site.

18. A computer program product to protect data, the computer program product being embodied in a non-transitory computer readable storage medium comprising computer instructions for:
receiving a backup appliance configuration data associated with a first backup appliance associated with a first virtual machine environment at a host site, wherein the backup appliance configuration data indicates that the first backup appliance is configured with an IP address associated with the host site and an IP address associated with a remote replication site; and
replicating the backup appliance configuration data to a remote replication site,
wherein the backup appliance configuration data includes data usable at the remote replication site to provide at the remote replication site the replicated backup appliance that is associated with a second virtual machine environment at the remote replication site, wherein the IP address associated with the remote replication site is used to register the replicated backup appliance and enables the replicated backup appliance to access backup data stored by the first backup appliance and to use said backup data stored by the first backup appliance to recover to hosts at the remote replication site one or more virtual machines associated with the first virtual machine environment.

19. The computer program product of claim 18, wherein the backup appliance configuration data includes an IP address of a hypervisor manager at the remote replication site.

20. The computer program product of claim 19, wherein the backup appliance configuration data is used at the replication site to instantiate the replicated backup appliance at the remote replication site and to register the replicated backup appliance to the hypervisor manager at the remote replication site.

* * * * *